(12) United States Patent  
Liang

(10) Patent No.: US 12,108,714 B1  
(45) Date of Patent: Oct. 8, 2024

(54) 3D POP UP PAPER FLOWER BOUQUET

(71) Applicant: Yusheng Liang, Gaozhou (CN)

(72) Inventor: Yusheng Liang, Gaozhou (CN)

( * ) Notice: Subject to any disclaimer, the term of this patent is extended or adjusted under 35 U.S.C. 154(b) by 0 days.

(21) Appl. No.: 18/429,384

(22) Filed: Jan. 31, 2024

(51) Int. Cl.  
*A47G 7/06* (2006.01)  
*A01G 5/04* (2006.01)  
*G09F 1/06* (2006.01)

(52) U.S. Cl.  
CPC .............. *A01G 5/04* (2013.01); *A47G 7/063* (2013.01); *G09F 1/06* (2013.01)

(58) Field of Classification Search  
CPC .. A01G 5/04; A47G 7/063; G09F 1/06; B42D 15/04  
See application file for complete search history.

(56) References Cited

U.S. PATENT DOCUMENTS

| | | | | |
|---|---|---|---|---|
| 2007/0294925 A1* | 12/2007 | L'Hotel | ............... | G09F 1/06 40/124.19 |
| 2008/0241445 A1* | 10/2008 | Medeiros Santos | ... | B65D 5/244 428/34.1 |
| 2012/0073192 A1* | 3/2012 | Tiers | ............... | B65D 5/46056 47/41.01 |
| 2014/0314970 A1* | 10/2014 | Patrou | ............... | B44C 5/00 428/12 |
| 2015/0128462 A1* | 5/2015 | Crowell | ............... | B32B 3/06 428/101 |
| 2022/0061440 A1* | 3/2022 | Karpiel | ............... | G09F 1/06 |
| 2022/0122487 A1* | 4/2022 | Bucco | ............... | G09F 1/06 |

* cited by examiner

*Primary Examiner* — Gary C Hoge  
(74) *Attorney, Agent, or Firm* — Ying-Ting Chen

(57) ABSTRACT

A 3D pop up paper flower bouquet includes a paper flower body and a supporting brace which is connected to a vase portion of the paper flower body, wherein the paper flower body and the supporting brace is capable of being shifted between an folded state in which the paper flower body and the supporting brace are collapsed and stacked with each other and an unfolded state in which the supporting brace is unfolded to brace the vase portion from inside to pop up the paper flower body.

24 Claims, 16 Drawing Sheets

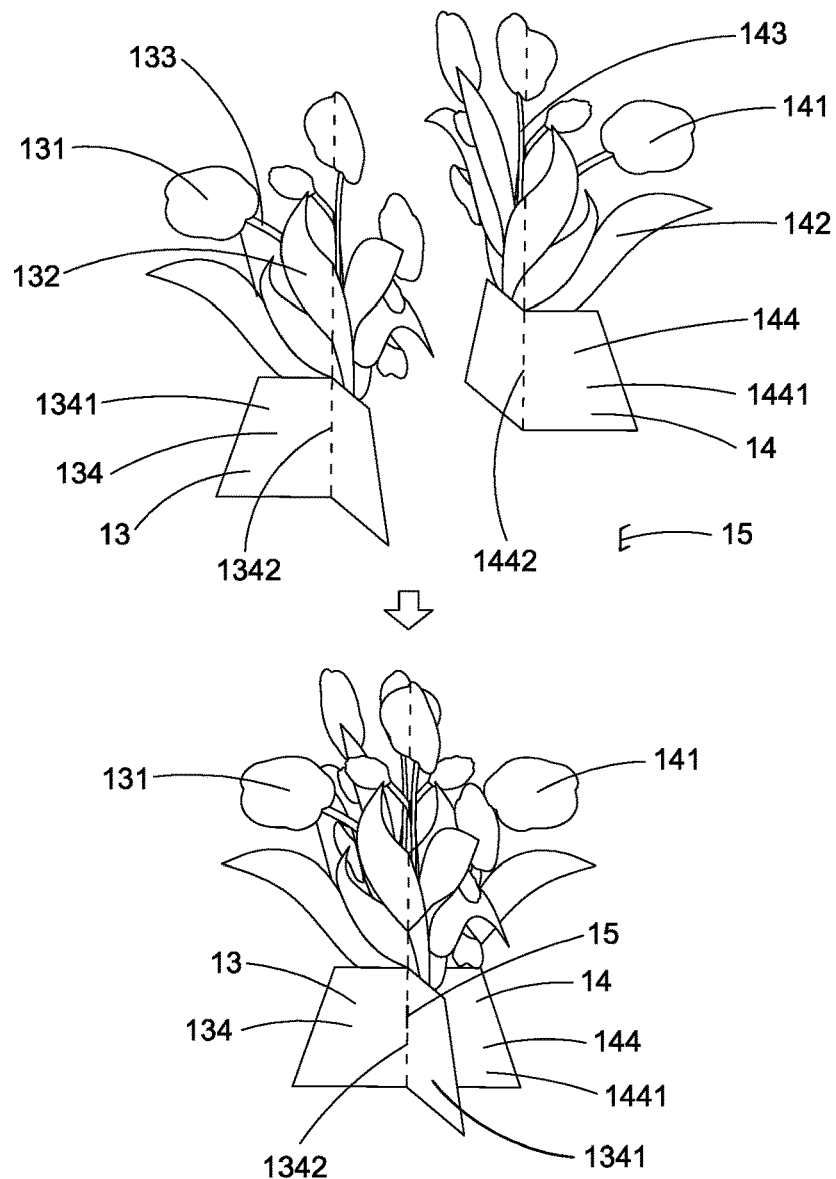
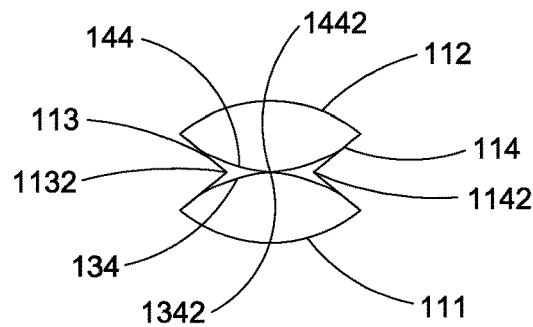
FIG.18
A-A
FIG.19

3D POP UP PAPER FLOWER BOUQUET

BACKGROUND OF THE PRESENT INVENTION

Field of Invention

The present invention relates to paper flower, and more particular to a 3D pop up paper flower bouquet which can be collapsed for convenient transportation and can be easy to be unfolded to provide a pop up bouquet gift that will wow a recipient who receives it.

Description of Related Arts

A paper flower bouquet, which is a lovely and thoughtful gift that can last a lifetime, is a beautiful and unique alternative to the traditional floral arrangements and can make a lasting floral arrangement that won't wilt or fade.

As shown in FIG. 1 and FIG. 2 of the drawings, a conventional pop up paper flower bouquet includes an encircling housing 1 and a flower part 2 including a lower portion which is disposed in the encircling housing 1, so that when the encircling housing 1 is in the folded state, the flower part 2 can be folded together with the encircling housing 1. As shown in the drawings, one or more resilient rubber bands 3 are provided at the lower portion of the flower part 2 in such a manner that when the conventional pop up paper flower bouquet is received in an express packaging envelope and the encircling housing 1 and the flower part 2 are thus in the folded state during storage, the resilient rubber bands 3 are in a tension state, and when the paper flower bouquet is taken out, the restoring of the resilient rubber bands 3 will pop up the bouquet by unfolding the encircling housing 1 and the flower part 2 so as to maintain the standing state of the flower part 2.

As shown in FIG. 3 and FIG. 4 of the drawings, another conventional pop up paper flower bouquet includes an encircling housing 1, a flower part, and a foldable support 4 which is a cross frame connected to the flower part within the encircling housing 1, one or more resilient rubber bands 3 are mounted to the lower portion of the flower part and the foldable support 4, the resilient rubber bands 3 are in a tension state when the bouquet is in the compressed and folded state, and when the paper flower bouquet is taken out, the restoring of the resilient rubber bands 3 and the unfolding of the cross frame will unfold the encircling housing 1 and the flower part so as to maintain and support the standing state of the flower part.

Accordingly, the above mentioned conventional paper flower bouquets adopt the resilient rubber bands 3 to allow the bouquet to pop up and present a three dimensional flower when the bouquet is in the unfolded state. However, it is complicate for mounting the resilient rubber bands 3 to the flower part 2, and also the resilient rubber bands 3 are easy to be damaged.

SUMMARY OF THE PRESENT INVENTION

The invention is advantageous in that it provides a 3D pop up paper flower bouquet which can be shifted between a folded collapsed state for storage and an unfolded deployed state for representing and showing a 3D (three dimensional) paper flower which can be a pleasant bouquet gift.

Another advantage of the present invention is to provide a 3D pop up paper flower bouquet which can be unfolded in a recipient's hand to reveal a beautiful and charming bouquet of artificial flowers and create the illusion of a real bouquet, so as to provide a feast for the eyes of the recipient and make the recipient feel happy.

Another advantage of the present invention is to provide a 3D pop up paper flower bouquet which does not require any resilient bands for causing the 3D pop up paper flower bouquet to be maintained in the unfolded state.

Another advantage of the present invention is to provide a 3D pop up paper flower bouquet which is only made of paper material, so that the manufacturing of the 3D pop up paper flower bouquet is simple.

Another advantage of the present invention is to provide a 3D pop up paper flower bouquet, wherein a supporting brace which is made of paper material can be disposed in a lower portion of a paper flower body during the unfolded state, so that the paper flower body is braced from inside for preventing the paper flower body from collapsing, so as to stably maintain the 3D displaying effect of the 3D pop up paper flower bouquet in the unfolded state.

Another advantage of the present invention is to provide a 3D pop up paper flower bouquet, wherein the supporting brace is able to provide a bracing effect along an inner circumference of the lower portion of the paper flower body, so that the paper flower body can be deployed and is not easy to collapse.

Another advantage of the present invention is to provide a 3D pop up paper flower bouquet, wherein in the unfolded state, the paper flower body comprises multiple flower layers extended along a depth thereof, so as to imitate a real flower bouquet.

Another advantage of the present invention is to provide a 3D pop up paper flower bouquet, wherein the paper flower body is made by adhering and folding paper sheets, so that the preparing of the paper flower body is convenient.

Another advantage of the present invention is to provide a 3D pop up paper flower bouquet, wherein in the folded and collapsed state, the multiple layers of both of the supporting brace and the paper flower body are stacked and laminated with each other, so that the collapsed paper flower bouquet can be in a compact size and is suitable for storage and transportation.

Additional advantages and features of the invention will become apparent from the description which follows, and may be realized by means of the instrumentalities and combinations particularly pointing out in the appended claims.

According to the present invention, the foregoing and other objects and advantages are attained by a 3D pop up paper flower bouquet, comprising:

a paper flower body comprising a vase portion and a flower portion connected to the vase portion; and a supporting brace which is connected to the vase portion, wherein the paper flower body and the supporting brace is capable of being shifted between an folded state in which the paper flower body and the supporting brace are collapsed and stacked with each other and an unfolded state in which the supporting brace is unfolded to brace the vase portion from inside to pop up the paper flower body.

According to an embodiment, the vase portion has an inner cavity and a bottom opening communicated to the inner cavity, wherein the supporting brace is capable of being pivoted out of the inner cavity through the bottom opening for being unfolded and being pivoted into the inner cavity for bracing the vase portion in the unfolded state.

According to an embodiment, in the folded state, the supporting brace is disposed into the inner cavity of the vase portion and is folded and stacked with the vase portion.

According to an embodiment, the supporting brace comprises a bottom board which is arranged to close the bottom opening and retain the supporting brace in the inner cavity of the vase portion in the unfolded state.

According to an embodiment, the supporting brace further comprises a first biasing card and a second biasing card, wherein the first biasing card and the second biasing card are respectively extended from two opposite sides of the bottom board for being in an vertical standing state to bias against inner surfaces of the vase portion in the unfolded state.

According to an embodiment, the supporting brace further comprises a top board, wherein the first biasing card and the second biasing card are extended between the bottom board and the top board, wherein in the folded state, the top board is stacked with the bottom board, wherein in the unfolded state, the first biasing card and the second biasing card are in the vertical standing state to space apart the top board from the bottom board.

According to an embodiment, the supporting brace further comprises a retaining strip which is extended from the bottom board, wherein when the bottom board is retained in the bottom opening of the vase portion, the vase portion comprises a bottom edge which is biasing against the retaining strip so as to prevent further pivotal movement of the supporting brace into the inner cavity of the vase portion.

According to an embodiment, the first biasing card has a retaining opening, wherein the retaining strip is disposed into the retaining opening when the supporting brace is in the folded state.

According to an embodiment, when the supporting brace is in the unfolded state, the supporting brace has an inner chamber defined between the top board and the bottom boards and two side openings formed between the first biasing card and the second biasing card, wherein the two side opening are communicated to the inner chamber.

According to an embodiment, the supporting brace further comprises a retaining card which has a retaining groove, wherein when the supporting brace is in the unfolded state to pop up the paper flower body, the retaining groove is engaged with a bottom edge of the vase portion to retain the bottom board at the bottom opening of the vase portion.

According to an embodiment, the supporting brace further comprises a first biasing card, a second biasing card, and a reinforcing member, wherein the bottom board is adapted to be folded along a board middle folding line, wherein the first biasing card and the second biasing card are respectively connected to two opposite sides of the bottom board, wherein the reinforcing member is movably connected to the bottom board, wherein when shifting to the unfolded state, the supporting brace is taken out of the inner cavity of the vase portion of the paper flower body, and then the bottom board is disposed at the bottom opening of the vase portion, the first biasing card and the second biasing card are moved to be in a vertical standing position, so as to bias against inner surfaces of the vase portion, so as to brace the vase portion from inside, wherein the reinforcing member is rotated to a position for biasing against the board folding line, so as to provide an enhanced support to the supporting brace and maintain the supporting brace in the unfolded state.

According to an embodiment, the supporting brace is made of an integral brace paper sheet which is foldable along a first brace folding line, a second brace folding line, a third brace folding line, a fourth brace folding line, and a fifth brace folding line to form a connecting tail, the bottom board, the first biasing card, the top board, the second biasing card, and a connecting strip for being connected to the vase portion, wherein the connecting tail is used for connecting two ends of the integral brace paper sheet, wherein the bottom board is defined between the first brace folding line and the second brace folding line, the first biasing card is defined between the second brace folding line and the third brace folding line, the top board is defined between the third brace folding line and the fourth brace folding line, the second biasing card is defined between the fourth brace folding line and the fifth brace folding line.

According to an embodiment, the vase portion comprise a front wall, a rear wall, a first side wall and a second side wall, wherein the first side wall and the second side wall are foldable and extended between the front wall and the rear wall to define the inner cavity.

According to an embodiment, the vase portion comprise a front wall, a rear wall, a first side wall and a second side wall, wherein the first side wall and the second side wall are foldable and extended between the front wall and the rear wall to define the inner cavity, wherein the said first side wall comprises two first folding layers which are folded along a first middle folding line, the second side wall comprises two second folding layers which are folded along a second folding line, wherein the top board has two top notches to matched with the first and second side walls in the unfolded state, wherein the bottom board has two bottom notches to matched with the first and second side walls in the unfolded state.

According to an embodiment, the flower portion comprises a front flower layer integrally extended from the front wall of the vase portion, and a rear flower layer integrally extended from the rear wall of the vase portion.

According to an embodiment, the paper flower body further comprises one or more auxiliary flower portions connected between the front flower layer and the rear flower layer.

According to an embodiment, the paper flower body further comprises a first auxiliary flower portion and a second auxiliary flower portion, wherein the first auxiliary flower portion comprises a first connecting sheet which is connected to the at least one of the first side wall and the second side wall, wherein the second auxiliary flower portion comprises a second connecting sheet which is connected to at least one of the first side wall and the second side wall, wherein the first side wall and the second side wall between the front wall and the rear wall are in a stretched state because of the bracing effect of the supporting brace, so as to allow the first auxiliary flower portion to be spaced apart from the front flower layer, the second auxiliary flower portion to be spaced apart from the first auxiliary flower portion, and the rear flower layer to be spaced apart from the second auxiliary flower portion.

According to an embodiment, the first connecting sheet is foldable along a first sheet folding line, wherein the second connecting sheet is foldable along a second sheet folding line, wherein the paper flower body further comprises a connecting element which connects the first connecting sheet with the second connecting sheet at a position corresponding to the first sheet folding line and the second sheet folding line.

According to an embodiment, the paper flower body is made of an integral paper sheet which is foldable along a first folding line, a first middle folding line, a second folding line, a third folding line, a second middle folding line, and a fourth folding line, so as to define a coupling edge for connecting two sides of the integral paper sheet, the first side wall, the front wall, the second side wall, and the rear wall, wherein the first side wall comprising two first folding layers is defined between the first folding line and the second folding line, the front wall is defined between the second folding line and the third folding line, the second side wall comprising two second folding layers is defined between the third folding line and the fourth folding line.

According to an embodiment, the first folding line and the second folding line are inclined folding lines to define boundaries of the first side wall and configure the first side wall with gradually reducing widths from top to bottom, wherein the third folding line and the fourth folding line are inclined folding lines to define boundaries of the second side wall and configure the second side wall with gradually reducing widths from top to bottom.

According to an embodiment, the vase portion has an inner cavity and a bottom opening communicated to the inner cavity, wherein the supporting brace comprises a bottom board which comprises two bottom board parts which are capable of being unfolded in the inner cavity for bracing the vase portion in the unfolded state and are capable of being folded in the inner cavity for folding the supporting brace in the vase portion.

According to an embodiment, the supporting brace comprises a board middle folding line and a bottom arm integrally and vertically extended from the bottom board at a position corresponding to the board middle folding line, wherein the bottom arm is arranged to be operated to driving the unfolding of the bottom board.

According to an embodiment, the supporting brace comprises a reinforcing member pivotally connected to the bottom board, wherein in the unfolded state, the reinforcing member is moved to a position biasing against the bottom board to support said bottom board in the unfolded state, wherein a circumferential edge of the bottom board is biasing against an inner surface of the vase portion in the unfolded state.

According to an embodiment, the paper flower body further comprises one or more auxiliary flower portions disposed in the vase portion, and a supporting arm which is penetrated though the one or more auxiliary flower portions and is configured to be rotatable for biasing against an inner surface of the vase portion to brace the vase portion in the unfolded state Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 18 are schematic views illustrating the process for connecting two auxiliary flower portions of the paper flower body of the 3D pop up paper flower bouquet according to the above preferred embodiment of the present invention.

FIG. 19 is a schematic view illustrating line A-A of FIG. 10.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 5 to FIG. 20 of the drawings, a 3D pop up paper flower bouquet according to a preferred embodiment of the present invention is illustrated. The 3D pop up paper flower bouquet comprises a paper flower body 10, and a supporting brace 20 which can be disposed in the paper flower body 10 for supporting the paper flower body 10 in an unfolded state. Accordingly, both of the paper flower body 10 and the supporting brace 20 can be shifted between a folded state in which the paper flower body 10 and the supporting brace 20 are stacked and laminated with each other and the unfolded state in which the supporting brace 20 functions to support the paper flower body 10 in a standing configuration for representing a 3D displaying effect.

Figure 1:
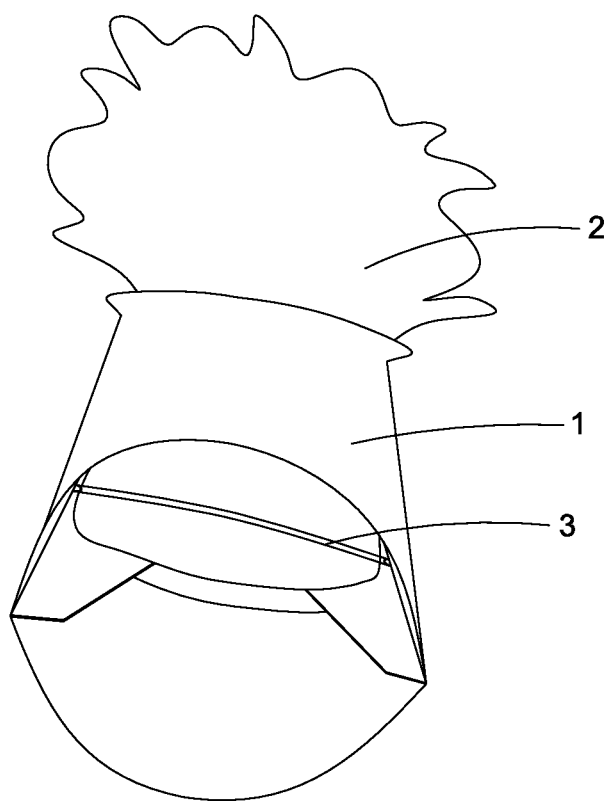
FIG. 1 is a perspective view of a conventional pop up paper flower bouquet in an unfolded state.
Figure 2:
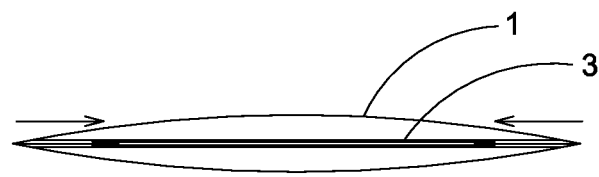
FIG. 2 is a bottom view of the conventional pop up paper flower bouquet of FIG. 1 which is shifting to a folded state.
Figure 3:
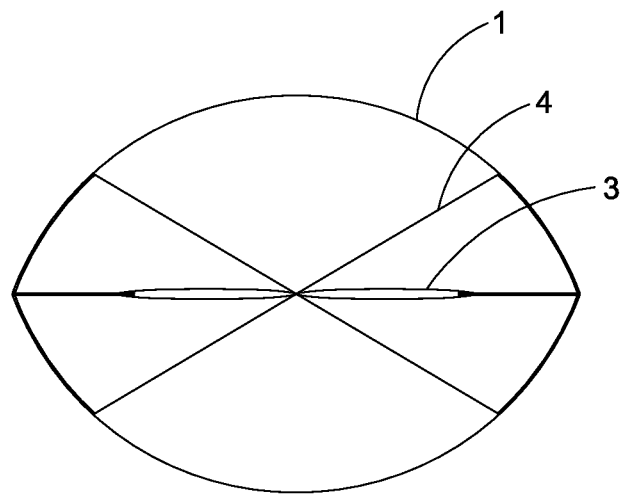
FIG. 3 is a bottom view of another conventional pop up paper flower bouquet in an unfolded state.
Figure 4:
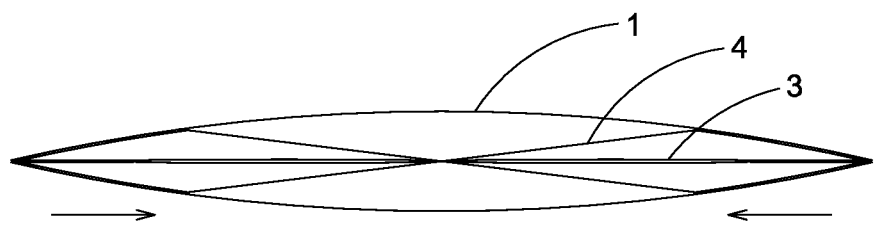
FIG. 4 is a bottom view of the conventional pop up paper flower bouquet of FIG. 3 which is shifting to a folded state.
Figure 5:
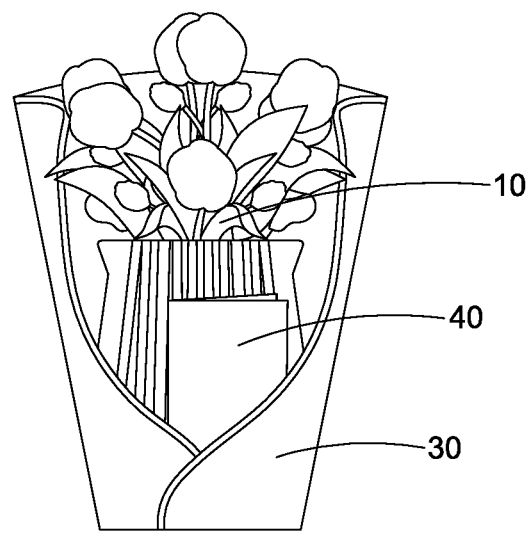
FIG. 5 is a perspective view of a 3D pop up paper flower bouquet according to a preferred embodiment of the present invention.
Figure 6:
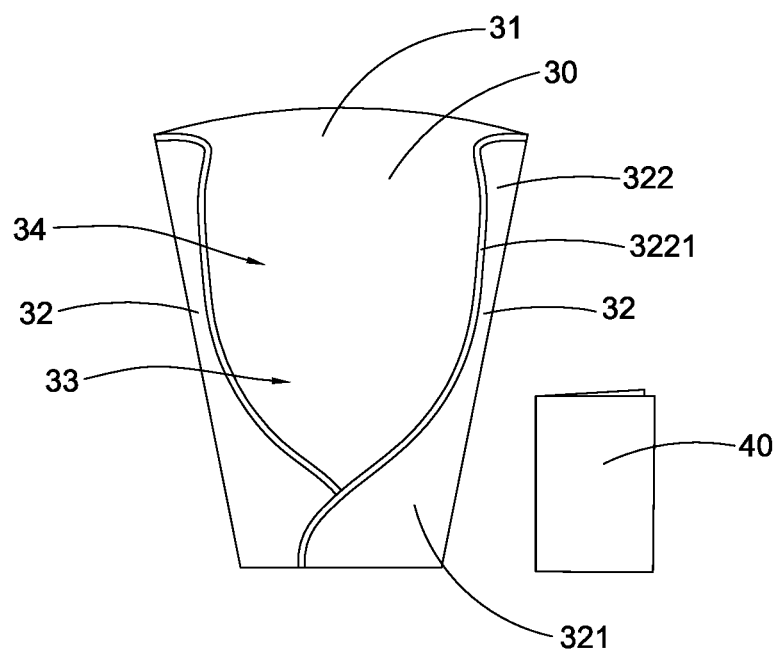
FIG. 6 is a perspective view of a bouquet envelop and a greeting card of the 3D pop up paper flower bouquet according to the above preferred embodiment of the present invention.
Figure 7:
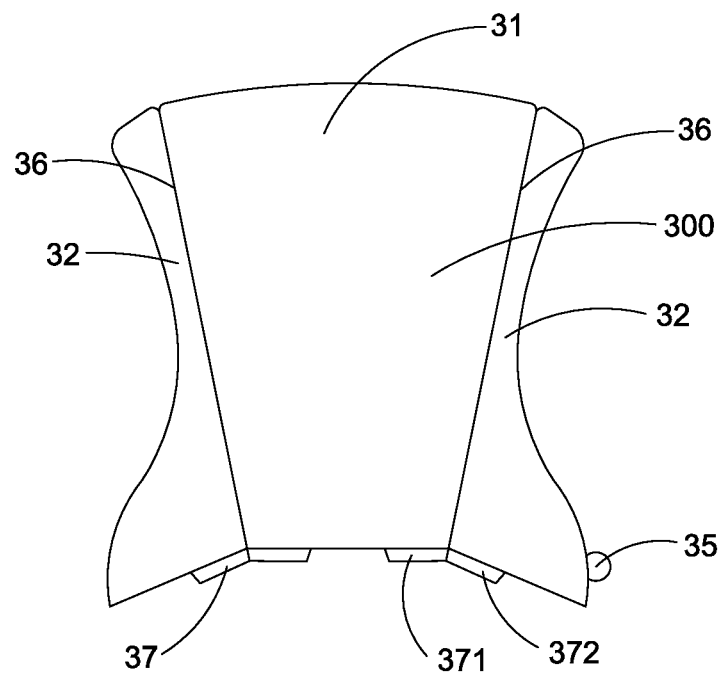
FIG. 7 is a front perspective view of the bouquet envelop of the 3D pop up paper flower bouquet according to the above preferred embodiment of the present invention.
Figure 8:
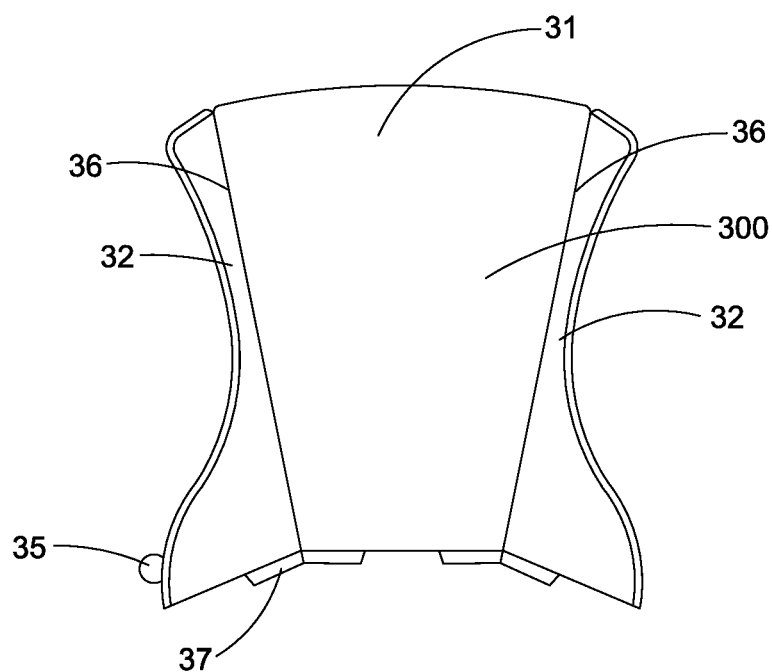
FIG. 8 is a rear perspective view of the bouquet envelop of the 3D pop up paper flower bouquet according to the above preferred embodiment of the present invention.
Figure 9:
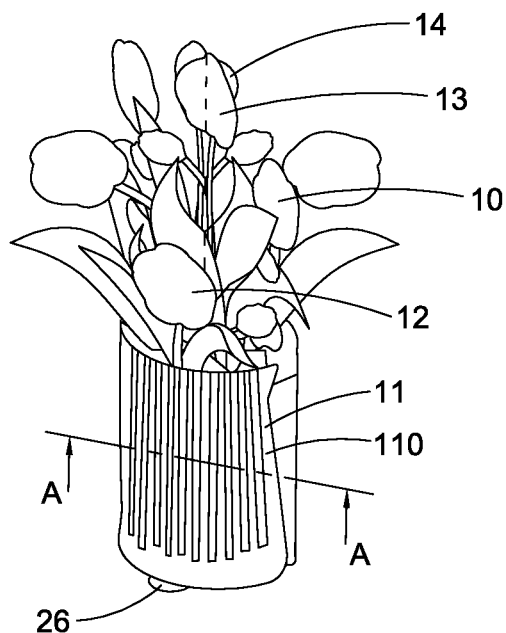
FIG. 9 is a perspective view of the 3D pop up paper flower bouquet comprising a paper flower body and a supporting brace according to the above preferred embodiment of the present invention.
Figure 10:
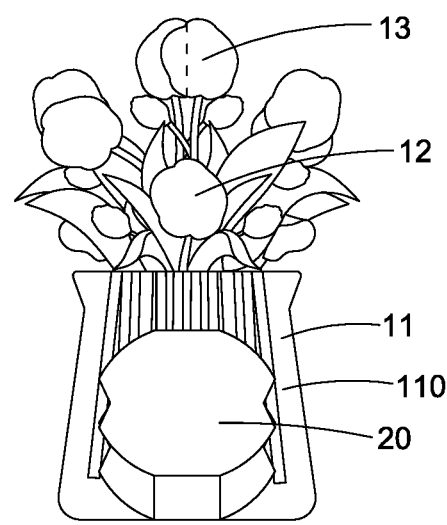
FIG. 10 is a front perspective view of the 3D pop up paper flower bouquet comprising the paper flower body and the supporting brace according to the above preferred embodiment of the present invention.
Figure 11:
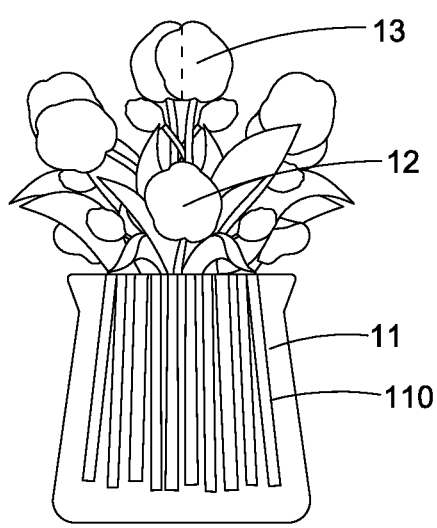
FIG. 11 is a rear perspective view of the 3D pop up paper flower bouquet comprising the paper flower body and the supporting brace according to the above preferred embodiment of the present invention.
Figure 12:
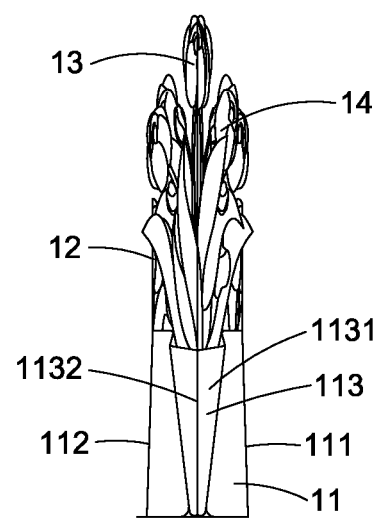
FIG. 12 is a side perspective view of the 3D pop up paper flower bouquet comprising the paper flower body and the supporting brace according to the above preferred embodiment of the present invention.
Figure 13:
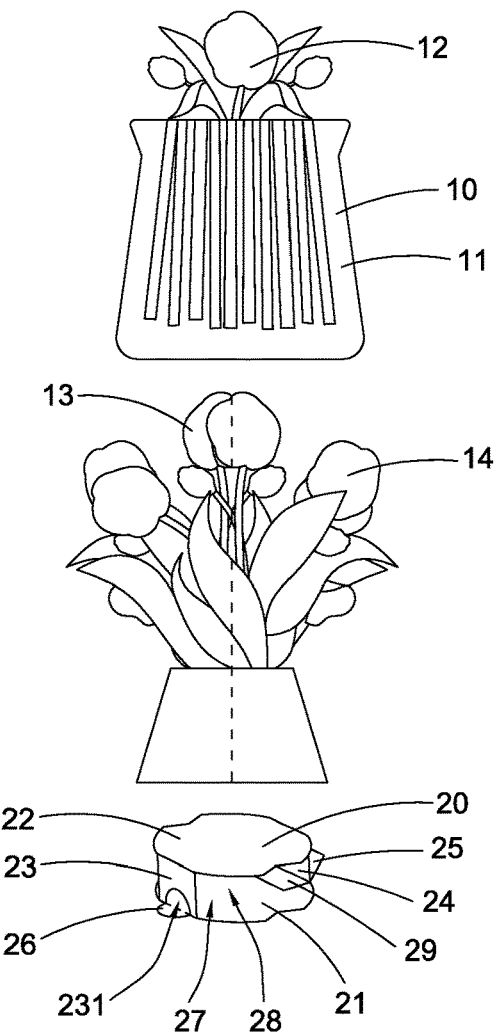
FIG. 13 is an exploded view of the 3D pop up paper flower bouquet comprising the paper flower body and the supporting brace according to the above preferred embodiment of the present invention.

When the 3D pop up paper flower bouquet is functioning as a flower bouquet gift, as shown in FIGS. 6 to 8 of the drawings, the 3D pop up paper flower bouquet may further comprise a bouquet envelope 30 and a greeting card 40, the greeting card 40 and the paper flower body 10 with the supporting brace 20 can be disposed in the bouquet envelope 30.

The bouquet envelope 30, which is made of an integral envelope paper sheet 300, comprises a back board 31 and two front cover strips 32 which are respectively extended and bent from two opposite sides of the back board 31 to define an envelope cavity 33 having a front access opening 34. Each of the front cover strips 32 comprises a lower enclosing portion 321 and an upper retaining portion 322 having an inner edge 3221 which is a curved edge, and the front access opening 34 is defined between the inner edges 3221 of the two upper retaining portions 322 of the two front cover strips 32. The lower enclosing portions 321 of the two front cover strips 32 are partially overlapped and adhered with each other to bond the two front cover strips 32 together by one or more bonding members 35 which can be applied with a glue.

The greeting card 40 and the paper flower body 10 with the supporting brace 20 can be disposed in the envelop cavity 33 of the bouquet envelope 30 and can be taken out from the front access opening 34 of the bouquet envelope 30.

FIG. 7 and FIG. 8 of the drawings illustrate the front and back of the integral envelope paper sheet 300 respectively, two envelope folding lines 36 are formed on the integral envelope paper sheet 300, so that when the integral envelope paper sheet 300 are folded along the two envelope folding lines 36, the back board 31 and the two front cover strips 32 are formed by the folded integral envelope paper sheet 300.

In addition, the bouquet envelope 30 may comprise two pairs of bonding strips 37 provided at the bottom thereof for being applied with glue for bonding the bottom of the back board 31 and the bottom of the front cover strips 32. Accordingly, each pair of bonding strips 37 comprises a first bonding strip 371 integrally extended from the bottom of the back board 32 and a second bonding strip 372 integrally extended from the bottom of the corresponding front cover strip 32, the first bonding strip 371 and the second bonding strip 372 are shaped and sized to couple with each other and can be applied with glues, so that the bonding strips are adhered with each other to attach the corresponding front cover strip 32 to the back board 31, and when the greeting card 40 and the paper flower body 10 with the supporting brace 20 are disposed in the envelop cavity 33 of the bouquet envelope 30, they are prevented from dropping out from the envelop cavity 33 through the bottom of the bouquet envelope 30.

The greeting card 40, which comprises two card portions 41 which are folded along a central folding line 42 of the card paper of the greeting card 40, allows the user to write his or her own message to the recipient for any occasion.

Referring to FIGS. 9 to 15 of the drawings, the paper flower body 10 of this embodiment comprises a vase portion 11, a flower portion 12 connected to the vase portion 11, and one or more auxiliary flower layers 13 and 14 attached to the vase portion 11 or the flower portion 12 to enhance the richness of the real flower stimulating effect.

The vase portion 11, which is arranged to imitate a vase for placing the flower portion 12, comprises an encircling wall 110 defining an inner cavity 1101 which is capable of receiving the supporting brace 20. The inner cavity 110 has a bottom opening 1102 which allows the supporting brace 20 to be pivoted in or out of the inner cavity 1101.

More specifically, in this embodiment, the encircling wall 110 of the vase portion 11 comprises a front wall 111, a rear wall 112, a first side wall 113 and a second side wall 114, the first side wall 113 and the second side wall 114 are connected to edges of the front wall 111 and edges of the rear wall 112, so that the two side walls 113 and 114 are extended between the front wall 111 and the rear wall 112 and are configured to be bendable and foldable between the front wall 111 and the rear wall 112, so as to shift the encircling wall 110 of the vase portion 11 between the folded state and the unfolded state.

Figure 14:
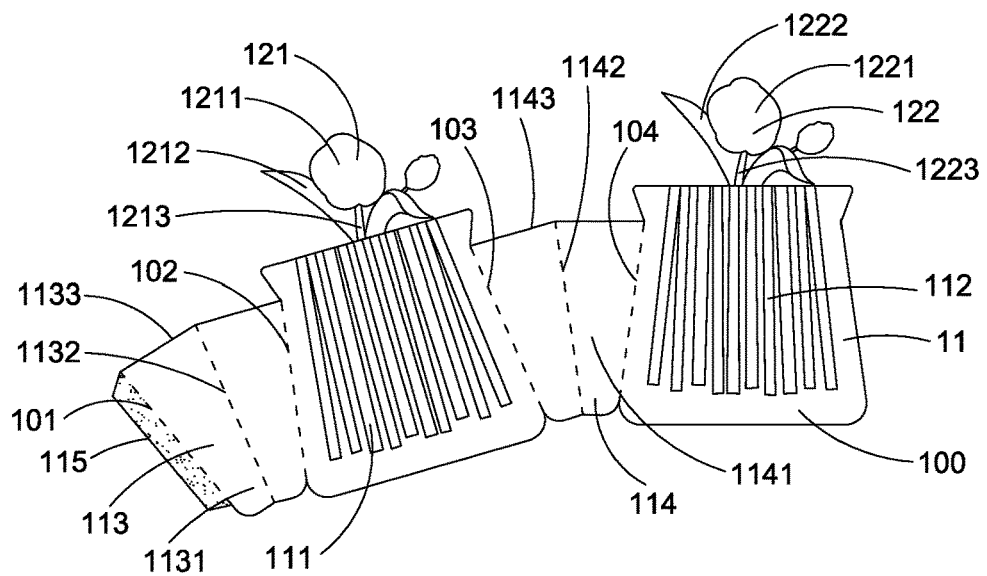
FIG. 14 is a perspective view of an integral paper sheet of the paper flower body of the 3D pop up paper flower bouquet according to the above preferred embodiment of the present invention.

As shown in FIG. 14 of the drawings, the first side wall 113 comprises two first folding layers 1131 and a first middle folding line 1132 between the two first folding layers 1131, the second side wall 114 comprises two second folding layers 1141 and a second middle folding line 1142 between the two second folding layers 1141. The two first folding layers 1131 can be folded along the first middle folding line 1132, so as to be stacked and overlapped with each other when the paper flower body 10 is in the folded state, the two second folding layers 1141 also are folded along the second middle folding line 1142, so as to be stacked and overlapped with each other when the paper flower body 10 is in the folded state, so that when the vase portion 11 of the paper flower body 10 is collapsed, the front wall 111 and the rear wall 112 are folded towards each other, so as to be overlapped with each other in the folded state.

As illustrated in FIGS. 9 to 15, the first side wall 113 is a left side wall of the vase portion 11, the second side wall 114 is a right side wall of the vase portion 11, the front wall 111 and the rear wall 112 can be configured to be two plane sheets that are not foldable, and the folding of the left side wall and the right side wall will allow the front wall 111 and the rear wall 112 to be attached and overlapped with each other, so as to be collapsed in the folded state for storage and transportation.

It is worth mentioning that all of the outer surfaces of the front wall 111, the rear wall 112, the first side wall 113 and the second side wall 114 are painted with decorative patterns such as green stems and leaves of flowers.

The flower portion 12 comprises a front flower layer 121 and a rear flower layer 122, each of the front flower layer 121 and the rear flower layer 122 is painted with flower patterns which can be roses, lilies, hyacinths, sunflowers, daisies, tulips, orchids, carnations, lavenders, hydrangeas, daffodils, peonies, marigolds, dahlias, chrysanthemums etc. The flower paintings can be arranged on both sides of the front flower layer 121 and the rear flower layer 122 to imitate real flowers, so that the user can view the flower decorations on both sides of the 3D pop up paper flower bouquet.

In this embodiment, the front flower layer 121 is integrally extended from the front wall 111 of the vase portion 11, the rear flower layer 122 is integrally extended from the rear wall 112 of the vase portion 11. Accordingly, the paintings on the front flower layer 121 are matched with the paintings on the front wall 111 of the vase portion 11, the paintings on the rear flower layer 122 are matched with the paintings on the rear wall 112 of the vase portion, so as to display and create an illusion of real flowers with matched stems and leaves.

It is worth mentioning that the front flower layer 121 and the rear flower layer 122 are also configured with flowers members, leaf members and stem members to imitate rear flowers. More specifically, the front flower layer 121 comprises a plurality of front flower members 1211, a plurality of front leaf members 1212, and one or more front stem members 1213. The rear flower layer 122 comprises a plurality of rear flower members 1221, a plurality of rear leaf members 1222, and one or more rear stem members 1223. The front flower members 1211 and the rear flower members 1221 are constructed to have real flower shapes, colors and configurations, the front leaf members 1212 and the rear leaf members 1222 are constructed to have real leaf shapes, colors and configurations, the front stem members 1213 and the rear stem members 1223 are constructed to have real stem shapes, colors and configurations, so that the illusion of the bouquet of real flowers can be created.

Since the front flower layer 121 and the rear flower layer 122 are respectively integrally extended from the front wall 111 and the rear wall 112 of the vase portion 11, when the front wall 111 and the rear wall 112 of the vase portion 11 are spaced apart from each other in the unfolded state, the front flower layer 121 and the rear flower layer 122 are also spaced apart from each other, so that multiple flower layers can be popped up to imitate real flowers. When the first side wall 113 is folded along the first middle folding line 1132 and the second side wall 114 is folded along the second middle folding line 1142, the front wall 111 and the rear wall 112 of the vase portion 11 are stacked and overlapped with each other, so that the front flower layer 121 and the rear flower layer 122 are also stacked with each other to form a laminated and layered structure that can be placed in the bouquet envelop 30 for storage and transportation.

As shown in FIG. 14 of the drawings, the vase portion 11 further comprises a coupling edge 115 which is extended from the first side wall 113, and can be applied with a glue, so as to be bonded with the lateral edge of the rear wall 112, so as to connect two sides of the vase portion 11 and form the encircling wall 110 with the inner cavity 1101.

Referring to FIG. 14 of the drawings, the paper flower body 10 of this embodiment is made of an integral paper sheet 100 which is foldable along a first folding line 101, a first middle folding line 1132, a second folding line 102, a third folding line 103, a second middle folding line 1142, a fourth folding line 104, so as to define the coupling edge 115, the first side wall 113, the front wall 111, the second side wall 114, and the rear wall 112.

More specifically, the first side wall 113 with the two first folding layers 1131 is defined between the first folding line 101 and the second folding line 102, the front wall 111 is defined between the second folding line 102 and the third folding line 103, the second side wall 114 with the two second folding layers 1141 is defined between the third folding line 103 and the fourth folding line 104.

The length of each of the first side wall 113 and the second side wall 114 can be smaller than the length of each of the front wall 111 and the rear wall 112 for facilitating the folding of the first side wall 113 and the second side wall 114. The end edges 1133 of the first side wall 113 and the end edges 1143 of the second side wall 114 are thus indented from the end edges of the front wall 111 and the rear walls.

In this embodiment, the end edge 1133 of the first side wall 113 at the bottom side has a width smaller than the other end edge 1133 of the first side wall 113 at the top side, the end edge 1143 of the second side wall 114 at the bottom side has a width smaller than the other end edge 1143 of the second side wall 113 at the top side. The first folding line 101 and the second folding line 102 are inclined folding lines to define boundaries of the first side wall 113 and configure the first side wall 113 with gradually reducing widths from top to bottom. The third folding line 103 and the fourth folding line 104 are inclined folding lines to define boundaries of the second side wall 114 and configure the second side wall 114 with gradually reducing widths from top to bottom.

In this embodiment, the paper flower body 10 further comprises one or more auxiliary flower portions which are provided between the front flower layer 121 and the rear flower layer 122 to provide more paper flower petals, so as to enrich the abundance of the flower imitating effect.

As shown in FIG. 13 and FIGS. 16 to 18 of the drawings, the paper flower body 10 comprises a first auxiliary flower portion 13 and a second auxiliary flower portion 14 arranged between the front flower layer 121 and the rear flower layer 122. The first auxiliary flower portion 13 comprises a plurality of first auxiliary flower members 131, a plurality of first auxiliary leaf members 132, one or more first auxiliary stem members 133 and a first connecting sheet 134 for connecting with the vase portion 11. The second auxiliary flower portion 14 comprises a plurality of second auxiliary flower members 141, a plurality of second auxiliary leaf members 142, one or more second auxiliary stem members 143 and a second connecting sheet 144 for connecting with the vase portion 11.

Correspondingly, The first auxiliary flower members 131 and the second auxiliary flower members 141 are constructed to have real flower shapes, colors and configurations, the first auxiliary leaf members 132 and the second auxiliary leaf members 142 are constructed to have real leaf shapes, colors and configurations, the first auxiliary stem members 133 and the second auxiliary stem members 143 are constructed to have real stem shapes, colors and configurations, so that additional layers of artificial paper flowers are provided to enhance the created illusion of the bouquet of real flowers.

In this embodiment, the first connecting sheet 134 of the first auxiliary flower portion 13 is connected to one or more of the first side wall 113 and the second side wall 114, but is not connected to the front wall 111 of the vase portion 11, the second connecting sheet 144 of the second auxiliary flower portion 14 is connected to one or more of the first side wall 113 and the second side wall 114, but is not connected to the rear wall 111 of the vase portion 11, so that when the vase portion 11 is in the unfolded state, the first side wall 113 and the second side wall 114 between the front wall 111 and the rear wall 112 are in a stretched state because of the bracing effect of the supporting brace 20, so that the first auxiliary flower portion 13 is spaced apart from the front flower layer 121, the second auxiliary flower portion 14 is spaced apart from the first auxiliary flower portion 13, and the rear flower layer 122 is spaced apart from the second auxiliary flower portion 14, so that four flower layers along a depth are displayed with a 3D pop up effect.

In the folded state, the first side wall 113 and the second side wall 114 are folded along the folding lines 1132 and 1142 respectively, and the front flower layer 121, the first auxiliary flower portion 13, the second auxiliary flower portion 14, and the rear flower layer 122 are pulled by the folded first side wall 113 and the second side wall 114, so as to reduce the gaps between the two adjacent layer, and thus the four flower layers are stacked with each other.

In this embodiment, as shown in FIG. 19 of the drawings, the first side wall 113 comprises two first folding layers 1131, and the second side wall 114 comprises two second folding layers 1141, the first connecting sheet 134 is adhered to one first folding layer 1131 and one second folding layer 1141 which are at the front side, the second connecting sheet 144 is connected to the other first folding layer 1131 and the other second folding layer 1141 which are at the rear side, so that the first auxiliary flower portion 13 is sandwiched between a pair of folding layers and the front flower layer 121, the second auxiliary flower portion 14 is sandwiched between another pair of folding layers and the rear flower layer 122.

When in the unfolded state, because of the bracing effect of the supporting brace 20, the first side wall 113 and the second side wall 114 will be in the stretched state with a V-shaped configuration, the first connecting sheet 134 is extended along a curved line between the second connecting sheet 144 and the front wall 111 of the vase portion 11, the second connecting sheet 144 is extended along a curved line between the first connecting sheet 134 and the rear wall 112 of the vase portion 11, so that the first auxiliary flower portion 13 and the second auxiliary flower portion 14 are respectively extended in curved planes, so as to enhance the 3D displaying effect.

Referring to FIG. 18 of the drawings, the first connecting sheet 134 comprises two first sheet parts 1341 and a first sheet folding line 1342, the second connecting sheet 144 comprises two second sheet parts 1441 and a second sheet folding line 1442, the first sheet folding line 1342 is aligned with the second sheet folding line 1442, a connecting element 15 such as a staple can be used to connect the first connecting sheet 134 with the second connecting sheet 144 at a position corresponding to the first sheet folding line 1342 and the second sheet folding line 1442, so that in the unfolded state, the first connecting sheet 134 is prevented from moving towards the front wall 111 of the vase portion 11, the second connecting sheet 144 is prevented from moving towards the rear wall 112 of the vase portion 112, so that the stable stretched state of the first auxiliary flower portion 13 and the second auxiliary flower portion 14 can be maintained and enhanced.

The supporting brace 20 of this embodiment is connected to the vase portion 11 of the paper flower body 10 and can be shifted between the folded state and the unfolded state. In the folded state, the supporting brace 20 is a laminated structure that is folded and collapsed between the front wall 111 and the rear wall 112 of the vase portion. In the unfolded state, the collapsed supporting brace 20 is taken out of the inner cavity 1101 of the vase portion 11 and is shifted to the unfolded state by a hand of the user, and then the unfolded supporting brace 20 is inserted back and pop into the inner cavity 1101 of the vase portion 11, so as to support the paper flower body 10 in the unfolded state.

More specifically, the supporting brace 20 of this embodiment is a card board comprising a bottom board 21, a top board 22, a first biasing card 23, a second biasing card 24 and a connecting strip 25, the bottom board 21 and the top board 22 are shaped and sized to be matched with each other, the first biasing card 23 and the second biasing card 24 are integrally extended between the bottom board 21 and the top board 22 and are provided at two opposite sides of the supporting brace 20, the connecting strip 25 is arranged to be applied with a glue for being bonded with the inner surface of the vase portion 11, such as the inner surface of the front wall 111, or the inner surface of the rear wall 112 of the vase portion 11. In this embodiment, each of the bottom board 21 and the top board 22 has a circular shape.

When in the folded and collapsed state, the bottom board 21 and the top board 22 are overlapped with each other, the first biasing card 23 and the second biasing card 24 which are pivotally connected between the bottom board 21 and the top board 22 can be collapsed, so as to be parallel with the bottom board 21 and the top board 22, so that the supporting brace 20 is in a laminated and folded state.

Figure 20:
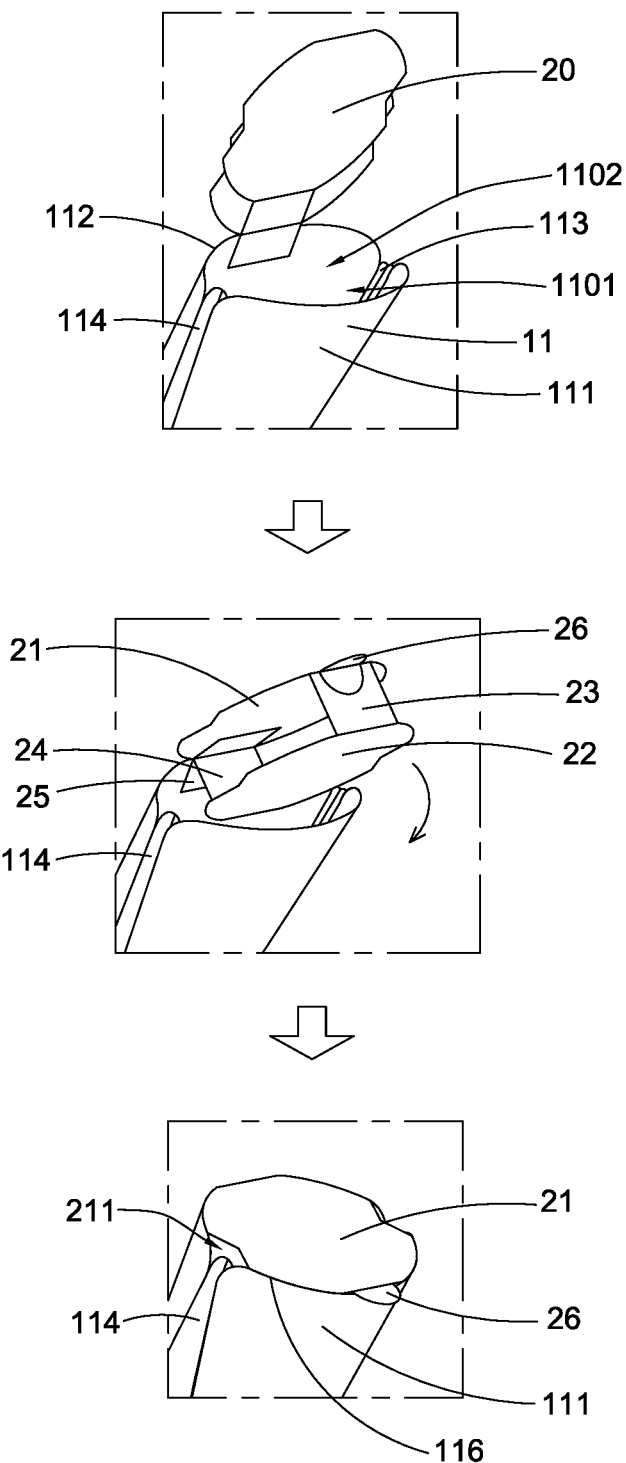
FIG. 20 are schematic views illustrating the process for popping the supporting brace into the vase portion of the paper flower body of the 3D pop up paper flower bouquet according to the above preferred embodiment of the present invention.
Figure 21:
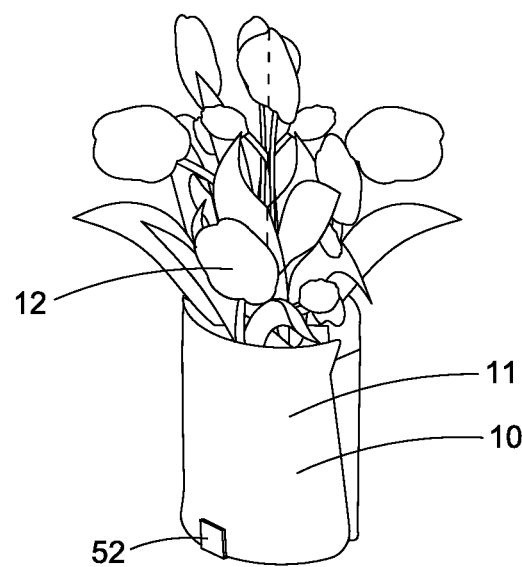
FIG. 21 is a perspective view of a 3D pop up paper flower bouquet according to a first alternative mode of the above preferred embodiment of the present invention.
Figure 22:
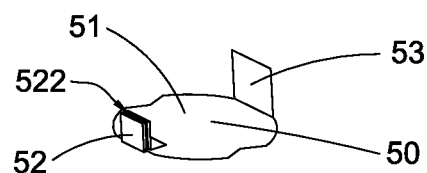
FIG. 22 is a perspective view of a supporting brace of the 3D pop up paper flower bouquet according to the above first alternative mode of the above preferred embodiment of the present invention.
Figure 23:
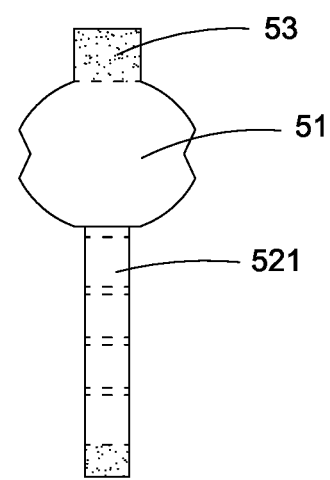
FIG. 23 is a perspective view of an integral brace paper sheet of the supporting brace of the 3D pop up paper flower bouquet according to the above first alternative mode of the above preferred embodiment of the present invention.

As shown in FIG. 20 of the drawings, when shifting to the unfolded state, the user can pull the supporting brace 20 out of the inner cavity 1101 of the vase portion 11 and then use his or her fingers to unfold the supporting brace 20 so that the first biasing card 23 and the second biasing card 24 are in a standing vertical state, so as to allow the top board 22 to be spaced apart from the bottom board 21. The unfolded supporting brace 20 is then inserted into the inner cavity 1101 again, so that the bottom board 21 is provided at a position corresponding to the bottom opening 1102 of the vase portion 11 to close the bottom opening 1102, the first biasing card 23 and the second biasing card 24 are extended into the inner cavity 1101 of the vase portion 11, so as to bias against the inner surfaces of the vase portion 11 for bracing and supporting the vase portion 11 in the unfolded state.

In this embodiment, in the unfolded state, the first biasing card 23 and the second biasing card 24 are respectively biasing against the inner surfaces of the front wall 111 and the rear wall 112 of the vase portion 11, so as to brace the vase portion 11 from the inside, so that the flower portion 12 is also maintained in the unfolded state.

The bottom board 21 has two bottom notches 211 formed at two opposite sides thereof, the top board 22 has two top notches 221 formed at two opposite sides thereof. Each of the bottom notches 211 and the top notches 221 is formed with a V-shape, so as to match with the first side wall 113 and the second side wall 114 each of which is configured in V-shape in the unfolded state.

Accordingly, the first biasing card 23 and the second biasing card 24 brace the vase portion 11 along a circumferential direction and each provides a bracing area that can be biasing against the inner surface of the front wall 111 or the inner surface of the rear wall 112, the bottom board 21 and the top board 22 disposed into the inner cavity 1101 of the vase portion 11 will enhance the stability of the unfolded supporting brace 20 and maintain the vertical standing state of the first biasing card 23 and the second biasing card 24, so that the vase portion 11 and the follower portion 12 is braced in the pop up state.

In this embodiment, the supporting brace 20 further comprises a retaining element 26 which is pivotally extended from the bottom board 21 and can be positioned corresponding to a retaining opening 231 in the first biasing card 23. When in the unfolded state, the retaining element 26 is biasing against the bottom edge 116 of the vase portion 11, so as to prevent the further pivotal movement of the supporting brace 20 towards the inner cavity 1101 of the vase portion 11. In other words, the bottom board 21 is positioned at the bottom opening 1102 of the vase portion 11, and the retaining element 26 is provided at the outer side of the bottom opening 1102 of the vase portion 11, so as to prevent the inward pivotal movement of the supporting brace 20.

Alternatively, the retaining element 26 can be folded upward by the user, so that retaining element 26 can be extended in a vertical direction, and thus the bottom edge 116 of the vase portion 11 can be sandwiched between the first biasing card 23 and the retaining element 26, so as to retain the supporting brace 20 at the position of the bottom opening 1102 of the vase portion 11.

In this embodiment, when the supporting brace 20 is in the unfolded state, the supporting brace 20 has an inner chamber 27 which has two side opening 28 formed between the two biasing cards 23 and 24, so that there is no additional materials required in the room within the supporting brace 20, so that the structure of the supporting brace 20 is simple.

Figure 15:
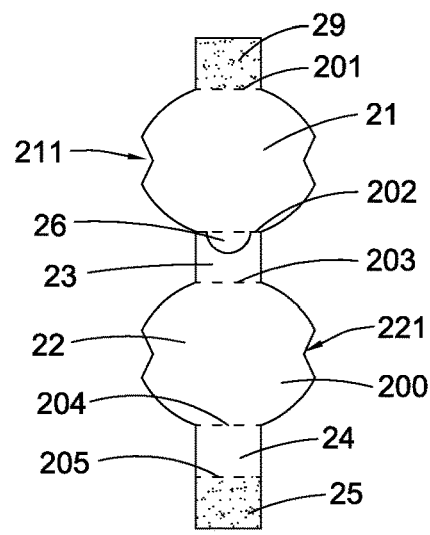
FIG. 15 is a perspective view of an integral brace paper sheet of the supporting brace of the 3D pop up paper flower bouquet according to the above preferred embodiment of the present invention.
Figure 16:
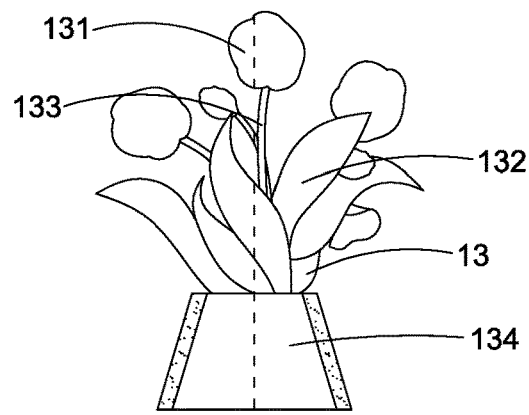
FIG. 16 is a front schematic view of an auxiliary flower portion of the paper flower body of the 3D pop up paper flower bouquet according to the above preferred embodiment of the present invention.
Figure 17:
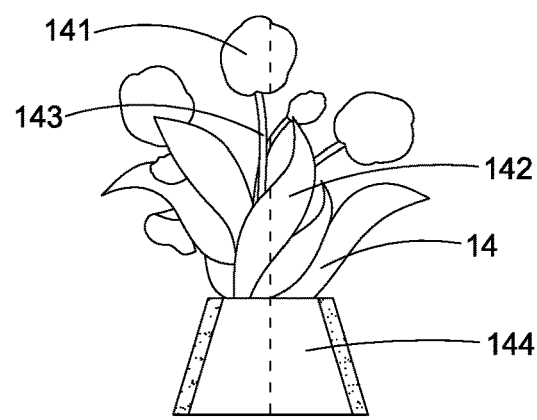
FIG. 17 is a rear schematic view of the auxiliary flower portion of the paper flower body of the 3D pop up paper flower bouquet according to the above preferred embodiment of the present invention.

Actually, as shown in FIG. 15 of the drawings, the supporting brace 20 can be made of an integral brace paper sheet 200 which is folded along a first brace folding line 201, a second brace folding line 202, a third brace folding line 203, a fourth brace folding line 2044, and a fifth brace folding line 205 to form a connecting tail 29, the bottom board 21, the first biasing card 23, the top board 22, the second biasing card 24, and the connecting strip 25. The connecting tail 29 is used for connecting the two ends of the integral brace paper sheet 200. The bottom board 21 is defined between the first brace folding line 201 and the second brace folding line 202, the first biasing card 23 is defined between the second brace folding line 202 and the third brace folding line 203, the top board 22 is defined between the third brace folding line 203 and the fourth brace folding line 204, the second biasing card 24 is defined between the fourth brace folding line 204 and the fifth brace folding line 205. Each of the first biasing card 23 and the second biasing card 24 is an elongated card plate that is connected to middle portion of the bottom board 21 or the middle portion of the top board 22.

It is worth mentioning that the material of the supporting brace 20 is not limited, such as plastic. Preferably, the supporting brace 20 is made of paper. And therefore, both of the paper flower body 10 and the supporting brace 20 are preferred to be made of paper sheets, so that they are easy to be painted with decorative illusion creating patterns for imitating a real flower bouquet, and has a light weight and easy to be folded and collapsed, but is also able to provide a pop up effect for setting up a 3D paper flower bouquet when being unfolded in a hand of the user.

Referring to FIGS. 21 to 24 of the drawing, a 3D pop up paper flower bouquet according to an alternative mode of the above preferred embodiment of the present invention is illustrated. The 3D pop up paper flower bouquet comprises the paper flower body 10, and a supporting brace 50 which can be disposed in the paper flower body 10 for supporting the paper flower body 10 in an unfolded state. Accordingly, both of the paper flower body 10 and the supporting brace 50 can be shifted between a folded state in which the paper flower body 10 and the supporting brace 50 are stacked and laminated with each other and the unfolded state in which the supporting brace 50 functions to support the paper flower body 10 in a standing configuration for representing a 3D displaying effect.

In this embodiment, the supporting brace 50, which is made of an integral brace paper sheet, comprises a bottom board 51, a retaining card 52, and a connecting strip 53. The bottom board 51 can be disposed at the bottom opening 1102 of the vase portion 11. the connecting strip 53 can be applied with a glue so as to adhered to the inner surface of the vase portion 11.

The retaining card 52 of this embodiment comprises a plurality of retaining sheets 521 such as four retaining sheet 521 which are stacked with each other to define a retaining groove 522 between two pairs of the retaining sheets 521. Each pair of the retaining sheets 521 comprises two retaining sheets 521 that are adhered with each other.

Figure 24:
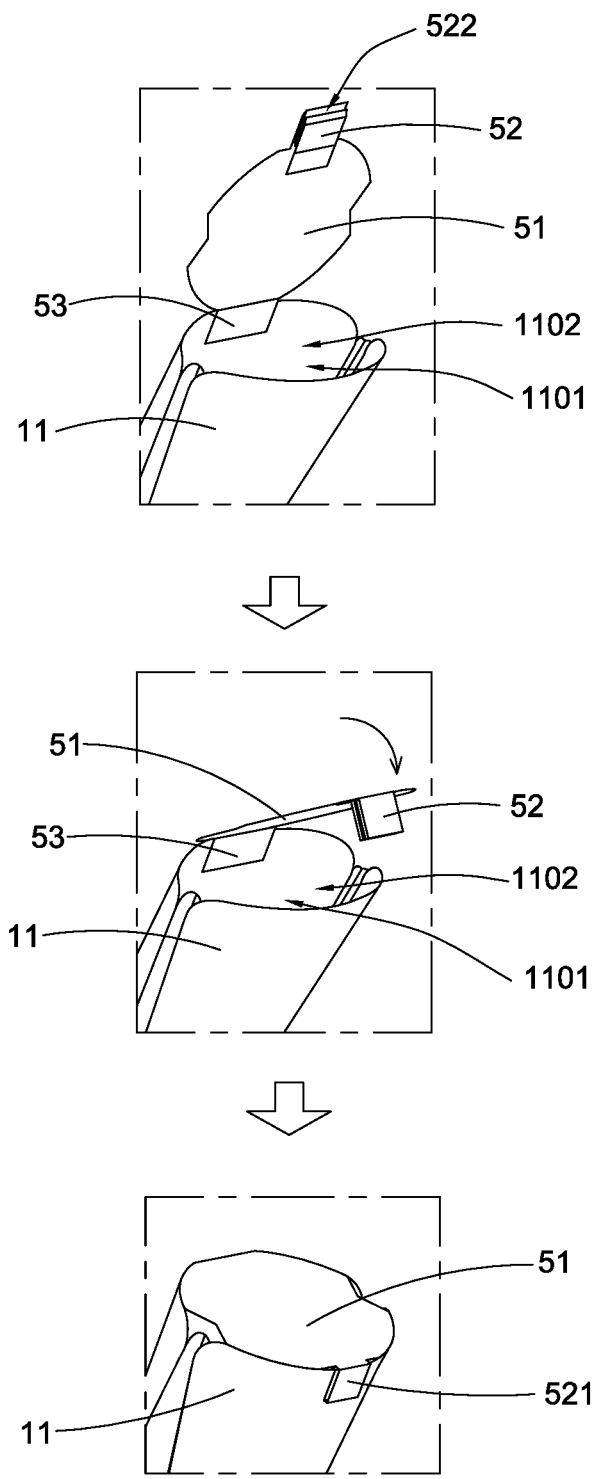
FIG. 24 are schematic views illustrating the process for popping the supporting brace into the vase portion of the paper flower body of the 3D pop up paper flower bouquet according to the above first alternative mode of the above preferred embodiment of the present invention.

As shown in FIG. 24 of the drawings, when shifting to the unfolded state, the supporting brace 50 is taken out of the inner cavity 1101 of the vase portion 11 of the paper flower body 10, and then the bottom board 51 is disposed at the bottom opening 1102 of the vase portion 11, the retaining sheets 521 can be moved to be in a vertical standing position that the retaining groove 500 is arranged to engage with the bottom edge 116 of the vase portion, so as to retain the vase portion 11 in the unfolded state, so that the entire paper flower body 10 is in a pop up state.

Figure 25:
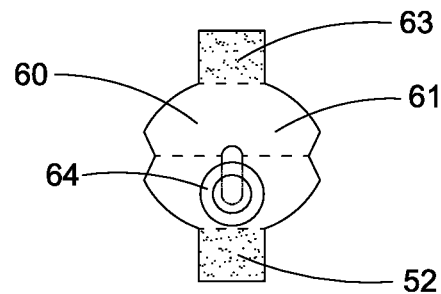
FIG. 25 is a perspective view of a supporting brace of a 3D pop up paper flower bouquet according to the a second alternative mode of the above preferred embodiment of the present invention.
Figure 26:
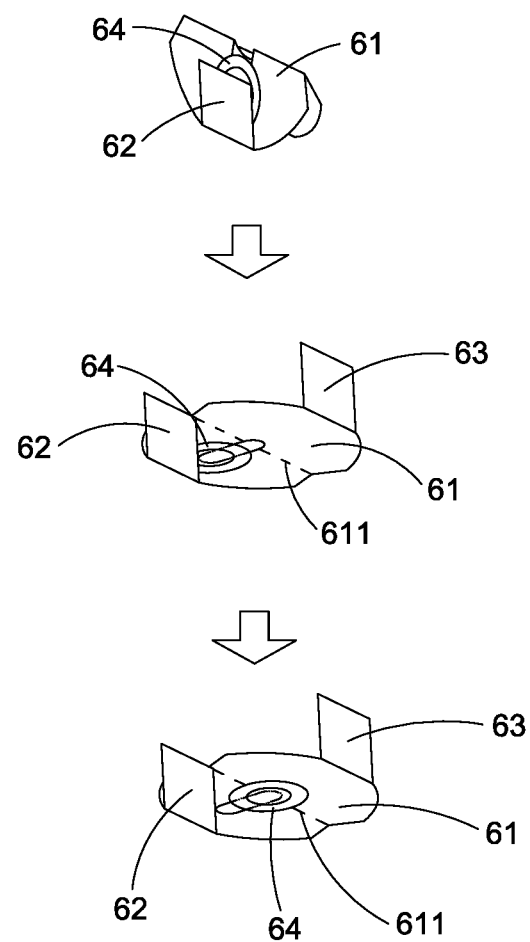
FIG. 26 are perspective views illustrating different states of the supporting brace of the 3D pop up paper flower bouquet according to the above second alternative mode of the above preferred embodiment of the present invention.
Figure 27:
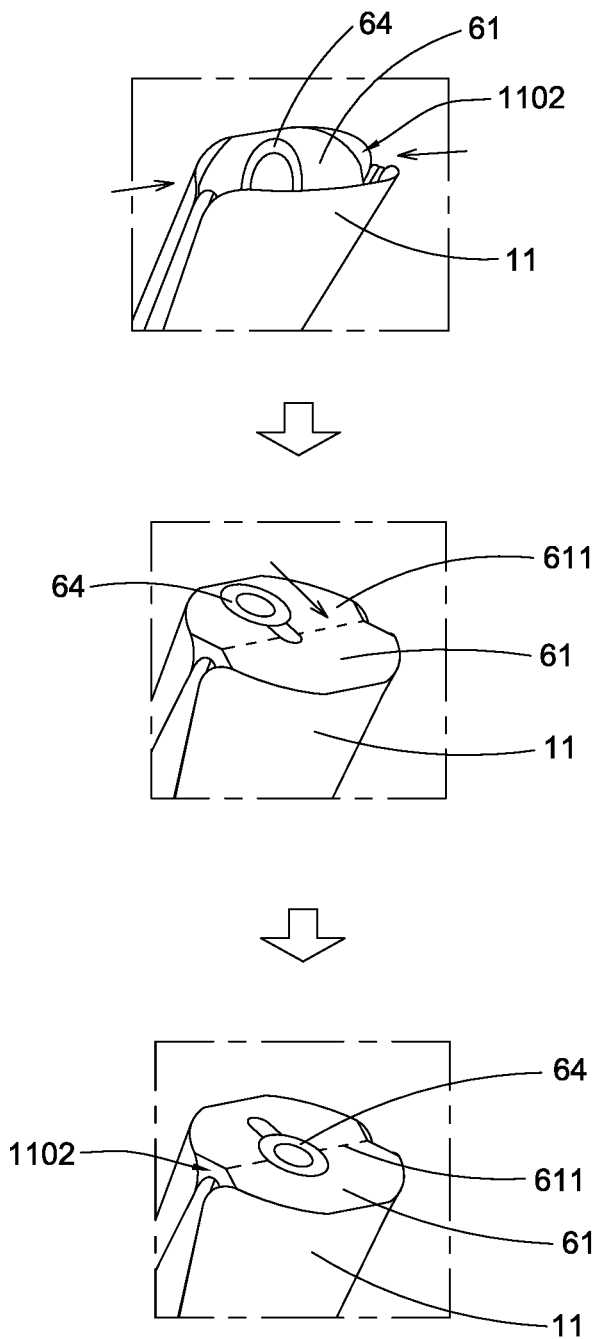
FIG. 27 are schematic views illustrating the process for popping the supporting brace into the vase portion of the paper flower body of the 3D pop up paper flower bouquet according to the above second alternative mode of the above preferred embodiment of the present invention.
Figure 28:
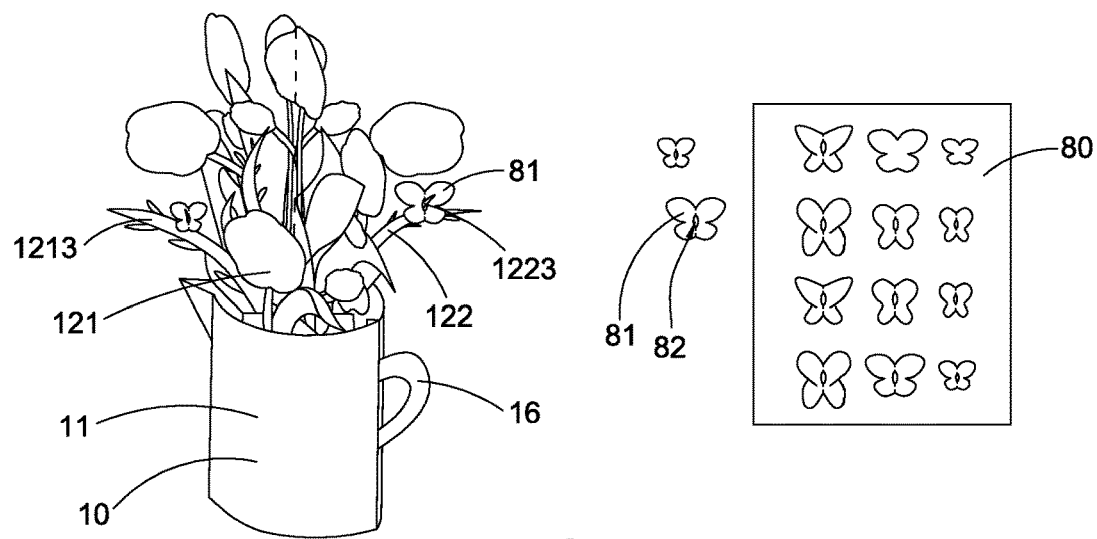
FIG. 28 is a perspective view of a 3D pop up paper flower bouquet according to a third alternative mode of the above preferred embodiment of the present invention.
Figure 29:
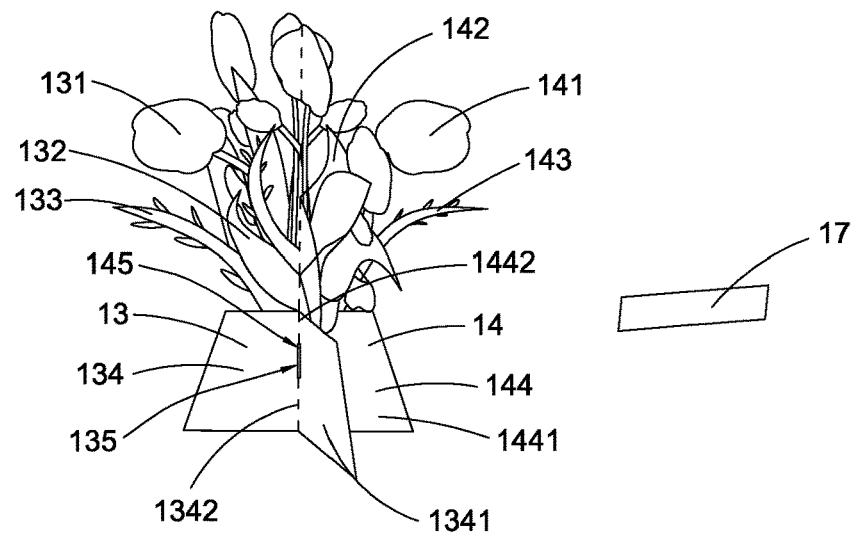
FIG. 29 is a perspective view of two auxiliary flower portions of the 3D pop up paper flower bouquet according to the above third alternative mode of the above preferred embodiment of the present invention.
Figure 30:
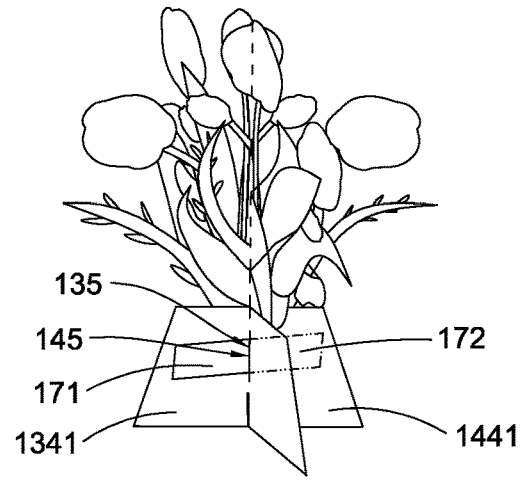
FIG. 30 is a perspective view illustrating a supporting arm connected to the two auxiliary flower portions of the 3D pop up paper flower bouquet according to the above third alternative mode of the above preferred embodiment of the present invention.

Referring to FIGS. 25 to 27 of the drawing, a 3D pop up paper flower bouquet according to an alternative mode of the above preferred embodiment of the present invention is illustrated. The 3D pop up paper flower bouquet comprises the paper flower body 10, and a supporting brace 60 which can be disposed in the paper flower body 10 for supporting the paper flower body 10 in an unfolded state. Accordingly, both of the paper flower body 10 and the supporting brace 60 can be shifted between a folded state in which the paper flower body 10 and the supporting brace 60 are stacked and laminated with each other and the unfolded state in which the supporting brace 60 functions to support the paper flower body 10 in a standing configuration for representing a 3D displaying effect.

In this embodiment, the supporting brace 60, which is connected to the vase portion 11 of the paper follower body 10, comprises a bottom board 61, a first biasing card 62, a second biasing card 63, and a reinforcing member 64. The bottom board 61 is adapted to be folded along a board middle folding line 611, the first biasing card 62 and the second biasing card 63 are respectively connected to two opposite sides of the bottom board 61. The reinforcing member 64 is movably connected to the bottom board 61.

As shown in FIG. 27 of the drawings, when shifting to the unfolded state, the supporting brace 60 is taken out of the inner cavity 1101 of the vase portion 11 of the paper flower body 10, and then the bottom board 61 is disposed at the bottom opening 1102 of the vase portion 11, the first biasing card 62 and the second biasing card 63 can be moved to be in a vertical standing position, so as to bias against the inner surface of the vase portion 11, so as to brace the vase portion 11 from the inside. The reinforcing member 64, which can be made of a rigid material, such as rigid paper board, plastic, or metal, can be rotated to cover the board folding line 611, so as to provide an enhanced support to the supporting brace 60 and maintain the supporting brace 60 in the unfolded state, so as to retain the vase portion 11 in the unfolded state, so that the entire paper flower body 10 is in a pop up state.

Referring to FIGS. 28 to 34 of the drawings, a 3D pop up paper flower bouquet according to a third alternative mode of the above preferred embodiment of the present invention is illustrated. The 3D pop up paper flower bouquet comprises the paper flower body 10, and a supporting brace 70 which can be disposed in the paper flower body 10 for supporting the paper flower body 10 in an unfolded state. Accordingly, both of the paper flower body 10 and the supporting brace 70 can be shifted between a folded state in which the paper flower body 10 and the supporting brace 70 are stacked and laminated with each other and the unfolded state in which the supporting brace 70 functions to support the paper flower body 10 in a standing configuration for representing a 3D displaying effect.

In this embodiment, the 3D pop up paper flower bouquet further comprises an insect paper board 80 which is provided with a plurality of detachable insect paper members 81, each of the insect paper members 81, which can be a butterfly paper member or a bee paper member, can be detached from the insect paper board 80 and placed on the paper flower body 10 to imitate a real butterfly or a real bee, so as to enhance a vivid and lively effect of the 3D pop up paper flower bouquet.

Each of the insect paper members 81 has a mounting hole 82 for engaging with a stem member of the paper flower body 10, such as a front stem member 1213 or a rear stem member 1223, so that the corresponding insect paper member 81 can be retained on the paper flower body 10.

The vase portion 11 of the paper flower body 10 can be constructed into any suitable configuration, such as the configuration of a vase, a watering can, a kettle, or a water bottle. In this embodiment, the paper flower body 10 may further comprises a handle portion 16 connected to the vase portion 11, so that it is convenient for the user to hold on the handle portion 16 to place the 3D pop up paper flower bouquet to a desired environment surface.

As shown in FIGS. 29 to 31B of the drawings, the paper flower body 10 further comprises the first auxiliary flower portion 13 and the second auxiliary flower portion 14 arranged between the front flower layer 121 and the rear flower layer 122 of the flower portion 12. The first auxiliary flower portion 13 comprises the plurality of first auxiliary flower members 131, the plurality of first auxiliary leaf members 132, one or more first auxiliary stem members 133 and the first connecting sheet 134 for connecting with the vase portion 11. The second auxiliary flower portion 14 comprises the plurality of second auxiliary flower members 141, the plurality of second auxiliary leaf members 142, one or more second auxiliary stem members 143 and the second connecting sheet 144 for connecting with the vase portion 11.

In this embodiment, the first connecting sheet 134 comprises the first sheet folding line 1342, the second connecting sheet 144 comprises the second sheet folding line 1442, the first connecting sheet 134 is connected to the second connecting sheet 144 by a glue along the first sheet folding line 1342 and the second sheet folding line 1442. The paper flower body 10 further comprises a supporting arm 17 which can be a rigid paper strip that is transversely penetrated through the first sheet folding line 1342 and the second sheet folding line 1442 for bracing the first auxiliary flower portion 13 and the second auxiliary flower portion 14.

Accordingly, the first auxiliary flower portion 13 has a first slit 135 formed at a middle of the two first sheet parts 1341, the second auxiliary flower portion 14 has a second slit 145 formed at a middle of the two second sheet parts 1441, the supporting arm 17 penetrates through the first slit 135 and the second slit 145 to define a first arm portion 171 which is extended between the two first sheet parts 1341 and a second arm portion 172 which is extended between the two second sheet parts 1441.

Figure 31A:
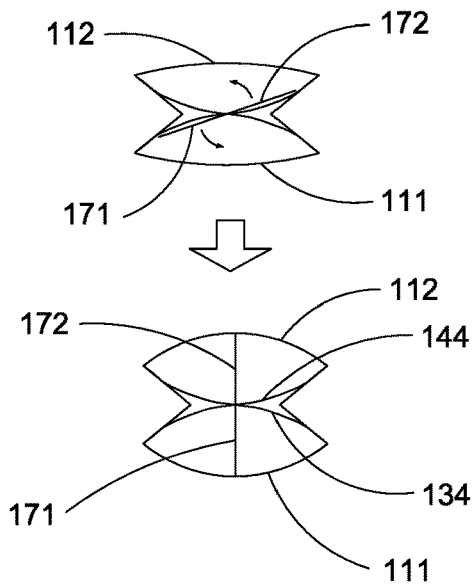
FIGS. 31A and 31B are bottom views illustrating the supporting arm being rotated for bracing the vase portion of the 3D pop up paper flower bouquet according to the above third alternative mode of the above preferred embodiment of the present invention.
Figure 31B:
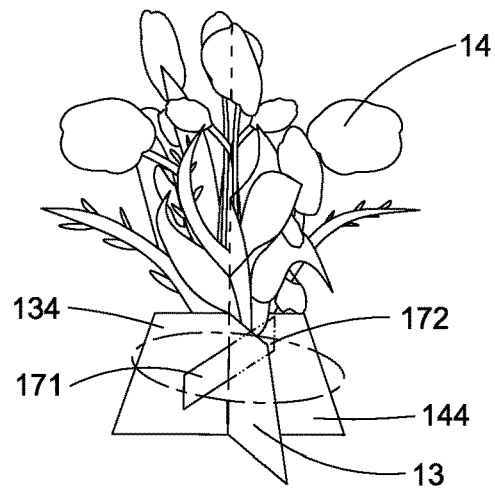

In the folded state, the supporting arm 17 can be folded with the first and second connecting sheets 134 and 144. In the unfolded state, as shown in FIGS. 31A and 31B of the drawings, the supporting arm 17 can be rotated so as to direct the first supporting arm 171 to a position biasing against the inner surface of the front wall 111 of the vase portion 11, and direct the second supporting arm 172 to a position biasing against the inner surface of the rear wall 112 of the vase portion 11, so that the supporting arm 17 is able to brace the vase portion 11 from inside and also maintain a distance between the front wall 111 of the vase portion 11 and the first auxiliary flower portion 13, and maintain a distance between the rear wall 112 of the vase portion 11 and the second auxiliary flower portion 14, so as to enhance the 3D pop up effect by the front flower layer 121, the first auxiliary flower portion 13, the second auxiliary flower portion 14, and the rear flower layer 122 which are spaced apart from each other to increase a depth of the 3D pop up paper flower bouquet.

Figure 32:
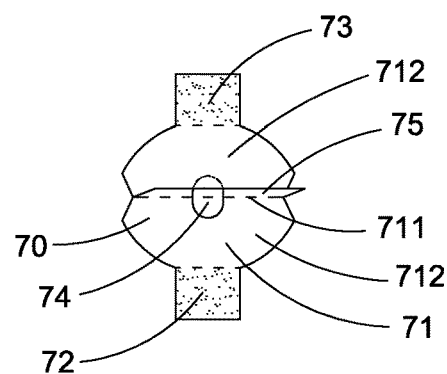
FIG. 32 is a perspective view of a supporting brace of the 3D pop up paper flower bouquet according to the above third alternative mode of the above preferred embodiment of the present invention.
Figure 33:
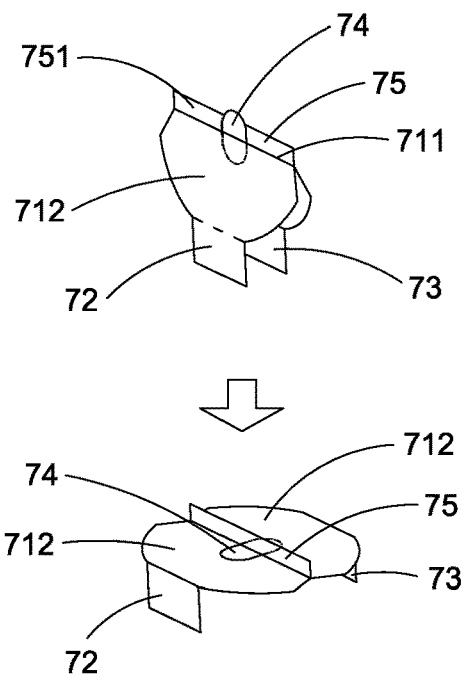
FIG. 33 is a perspective view illustrating the supporting brace being shifted between a folded state and an unfolded state of the 3D pop up paper flower bouquet according to the above third alternative mode of the above preferred embodiment of the present invention.
Figure 34:
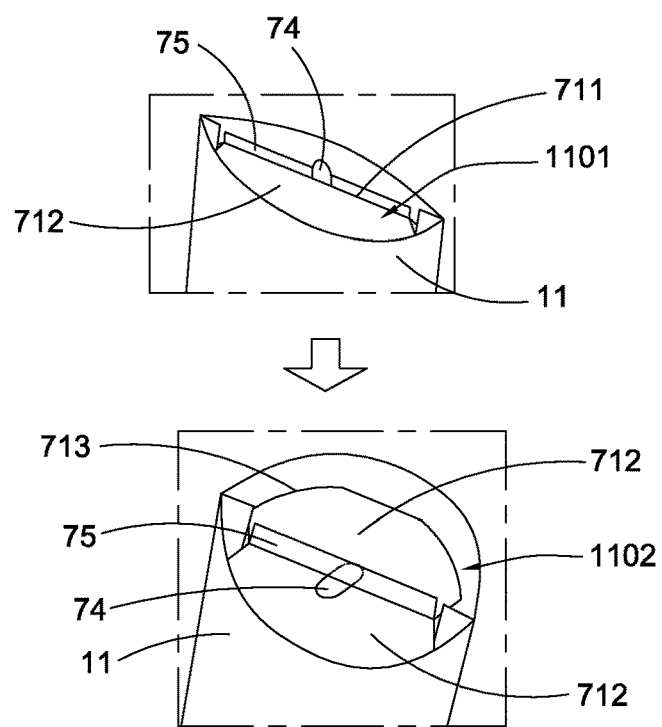
FIG. 34 is a schematic view illustrating the supporting brace being shifted between the folded state to the unfolded state in the vase portion of the 3D pop up paper flower bouquet according to the above third alternative mode of the above preferred embodiment of the present invention.

As shown in FIGS. 32 to 34, the supporting brace 70, which is connected to the vase portion 11 of the paper follower body 10, comprises a bottom board 71, a first biasing card 72, a second biasing card 73, and a reinforcing member 74. The bottom board 71 is adapted to be folded along a board middle folding line 711 to define two bottom board parts 712 which are respectively foldable along the board middle folding line 711, the first biasing card 72 and the second biasing card 73 are respectively connected to two opposite sides of the bottom board 71 and are also adhered to the vase portion 11. The reinforcing member 74 is movably connected to the bottom board 71.

In this embodiment, the supporting brace 70 further comprises a bottom arm 75 which is vertically extended from the bottom board 71 along the board middle folding line 711. The bottom arm 75 can be integrally formed with the bottom board 71 can may comprises two arm portion 751 which are overlapped with each other and adhered to each other by a glue, so as to enhance the structural strength thereof. The bottom arm 75, which is a paper strip, can be used to drive the folding and unfolding of the supporting brace 70.

As shown in FIG. 34 of the drawings, when shifting to the unfolded state, the supporting brace 70 is not need to take out of the inner cavity 1101 of the vase portion 11, but is pushed into a deeper position in the inner cavity 1101 of the vase portion 11 of the paper flower body 10 by pushing the bottom arm 75, and then the two bottom board parts 712 of bottom board 71 are moved from an overlapped vertical state to an unfolded state in which the two bottom board parts 712 are in a same horizontal state, so that bottom board 71 is unfolded and a circumferential edge 713 of the bottom board 71 is biasing against the inner surface of the vase portion 11, so as to brace the vase portion 11 from the inside. The reinforcing member 74 can be pushed to pivotally moved to a position biasing against the bottom of the bottom board 71, so as to provide an enhanced support to the supporting brace 70 and maintain the supporting brace 70 in the unfolded state, so as to retain the vase portion 11 in the unfolded state, so that the entire paper flower body 10 is in a pop up state.

When the 3D pop up paper flower bouquet is shifted from the unfolded state to the folded state, supporting arm 17 is rotated to be overlapped with the first and second connecting sheets 134 and 144, the bottom arm 75 is pulled toward the bottom opening 1102 so as to direct the two bottom board parts 712 of bottom board 71 to move toward the bottom opening 1102 and to be folded and overlapped with each other, so that the vase portion 11 is collapsed and the flower portion 12, the auxiliary flower portions 13 and 14 are driven to be overlapped with each other.

It is worth mentioning that an acoustic device or a lighting device can be attached to the above mentioned supporting braces 20, 50, 60 or 70, so as to further provide an acoustic effect or lighting effect when the 3D pop up paper flower bouquet is in the pop up state.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A 3D pop up paper flower bouquet, comprising:
   a paper flower body comprising a vase portion and a flower portion connected to the vase portion; and
   a supporting brace which is connected to the vase portion, wherein the paper flower body and the supporting brace is capable of being shifted between a folded state in which the paper flower body and the supporting brace are collapsed and stacked with each other and an unfolded state in which the supporting brace is unfolded to brace the vase portion from inside to pop up the paper flower body.

2. The 3D pop up paper flower bouquet according to claim 1, wherein the vase portion has an inner cavity and a bottom opening communicated to the inner cavity, wherein the supporting brace is capable of being pivoted out of the inner cavity through the bottom opening for being unfolded and being pivoted into the inner cavity for bracing the vase portion in the unfolded state.

3. The 3D pop up paper flower bouquet according to claim 2, wherein in the folded state, the supporting brace is disposed into the inner cavity of the vase portion and is folded and stacked with the vase portion.

4. The 3D pop up paper flower bouquet according to claim 3, wherein the supporting brace comprises a bottom board which is arranged to close the bottom opening and retain the supporting brace in the inner cavity of the vase portion in the unfolded state.

5. The 3D pop up paper flower bouquet according to claim 4, wherein the supporting brace further comprises a first biasing card and a second biasing card, wherein the first biasing card and the second biasing card are respectively extended from two opposite sides of the bottom board for being in an vertical standing state to bias against inner surfaces of the vase portion in the unfolded state.

6. The 3D pop up paper flower bouquet according to claim 5, wherein the supporting brace further comprises a top board, wherein the first biasing card and the second biasing card are extended between the bottom board and the top board, wherein in the folded state, the top board is stacked with the bottom board, wherein in the unfolded state, the first biasing card and the second biasing card are in the vertical standing state to space apart the top board from the bottom board.

7. The 3D pop up paper flower bouquet according to claim 5, wherein the supporting brace further comprises a retaining strip which is extended from the bottom board, wherein when the bottom board is retained in the bottom opening of the vase portion, the vase portion comprises a bottom edge which is biasing against the retaining strip so as to prevent further pivotal movement of the supporting brace into the inner cavity of the vase portion.

8. The 3D pop up paper flower bouquet according to claim 7, wherein the first biasing card has a retaining opening, wherein the retaining strip is disposed into the retaining opening when the supporting brace is in the folded state.

9. The 3D pop up paper flower bouquet according to claim 6, wherein when the supporting brace is in the unfolded state, the supporting brace has an inner chamber defined between the top board and the bottom boards and two side openings formed between the first biasing card and the second biasing card, wherein the two side opening are communicated to the inner chamber.

10. The 3D pop up paper flower bouquet according to claim 4, wherein the supporting brace further comprises a retaining card which has a retaining groove, wherein when the supporting brace is in the unfolded state to pop up the paper flower body, the retaining groove is engaged with a bottom edge of the vase portion to retain the bottom board at the bottom opening of the vase portion.

11. The 3D pop up paper flower bouquet according to claim 4, wherein the supporting brace further comprises a first biasing card, a second biasing card, and a reinforcing member, wherein the bottom board is adapted to be folded along a board middle folding line, wherein the first biasing card and the second biasing card are respectively connected to two opposite sides of the bottom board, wherein the reinforcing member is movably connected to the bottom board, wherein when shifting to the unfolded state, the supporting brace is taken out of the inner cavity of the vase portion of the paper flower body, and then the bottom board is disposed at the bottom opening of the vase portion, the first biasing card and the second biasing card are moved to be in a vertical standing position, so as to bias against inner surfaces of the vase portion, so as to brace the vase portion from inside, wherein the reinforcing member is rotated to a position for biasing against the board folding line, so as to provide an enhanced support to the supporting brace and maintain the supporting brace in the unfolded state.

12. The 3D pop up paper flower bouquet according to claim 6, wherein the supporting brace is made of an integral brace paper sheet which is foldable along a first brace folding line, a second brace folding line, a third brace folding line, a fourth brace folding line, and a fifth brace folding line to form a connecting tail, the bottom board, the first biasing card, the top board, the second biasing card, and a connecting strip for being connected to the vase portion, wherein the connecting tail is used for connecting two ends of the integral brace paper sheet, wherein the bottom board is defined between the first brace folding line and the second brace folding line, the first biasing card is defined between the second brace folding line and the third brace folding line, the top board is defined between the third brace folding line and the fourth brace folding line, the second biasing card is defined between the fourth brace folding line and the fifth brace folding line.

13. The 3D pop up paper flower bouquet according to claim 4, wherein the vase portion comprise a front wall, a rear wall, a first side wall and a second side wall, wherein the first side wall and the second side wall are foldable and extended between the front wall and the rear wall to define the inner cavity.

14. The 3D pop up paper flower bouquet according to claim 6, wherein the vase portion comprise a front wall, a rear wall, a first side wall and a second side wall, wherein the first side wall and the second side wall are foldable and extended between the front wall and the rear wall to define the inner cavity, wherein the said first side wall comprises two first folding layers which are folded along a first middle folding line, the second side wall comprises two second folding layers which are folded along a second folding line, wherein the top board has two top notches to matched with the first and second side walls in the unfolded state, wherein the bottom board has two bottom notches to matched with the first and second side walls in the unfolded state.

15. The 3D pop up paper flower bouquet according to claim 13, wherein the flower portion comprises a front flower layer integrally extended from the front wall of the vase portion, and a rear flower layer integrally extended from the rear wall of the vase portion.

16. The 3D pop up paper flower bouquet according to claim 15, wherein the paper flower body further comprises one or more auxiliary flower portions connected between the front flower layer and the rear flower layer.

17. The 3D pop up paper flower bouquet according to claim 15, wherein the paper flower body further comprises a first auxiliary flower portion and a second auxiliary flower portion, wherein the first auxiliary flower portion comprises a first connecting sheet which is connected to the at least one of the first side wall and the second side wall, wherein the second auxiliary flower portion comprises a second connecting sheet which is connected to at least one of the first side wall and the second side wall, wherein the first side wall and the second side wall between the front wall and the rear wall are in a stretched state because of the bracing effect of the supporting brace, so as to allow the first auxiliary flower portion to be spaced apart from the front flower layer, the second auxiliary flower portion to be spaced apart from the first auxiliary flower portion, and the rear flower layer to be spaced apart from the second auxiliary flower portion.

18. The 3D pop up paper flower bouquet according to claim 15, wherein the first connecting sheet is foldable along a first sheet folding line, wherein the second connecting sheet is foldable along a second sheet folding line, wherein the paper flower body further comprises a connecting element which connects the first connecting sheet with the second connecting sheet at a position corresponding to the first sheet folding line and the second sheet folding line.

19. The 3D pop up paper flower bouquet according to claim 15, wherein the paper flower body is made of an integral paper sheet which is foldable along a first folding line, a first middle folding line, a second folding line, a third folding line, a second middle folding line, and a fourth folding line, so as to define a coupling edge for connecting two sides of the integral paper sheet, the first side wall, the front wall, the second side wall, and the rear wall, wherein the first side wall comprising two first folding layers is defined between the first folding line and the second folding line, the front wall is defined between the second folding line and the third folding line, the second side wall comprising two second folding layers is defined between the third folding line and the fourth folding line.

20. The 3D pop up paper flower bouquet according to claim 19, wherein the first folding line and the second folding line are inclined folding lines to define boundaries of the first side wall and configure the first side wall with gradually reducing widths from top to bottom, wherein the third folding line and the fourth folding line are inclined folding lines to define boundaries of the second side wall and configure the second side wall with gradually reducing widths from top to bottom.

21. The 3D pop up paper flower bouquet according to claim 1, wherein the vase portion has an inner cavity and a bottom opening communicated to the inner cavity, wherein the supporting brace comprises a bottom board which comprises two bottom board parts which are capable of being unfolded in the inner cavity for bracing the vase portion in the unfolded state and are capable of being folded in the inner cavity for folding the supporting brace in the vase portion.

22. The 3D pop up paper flower bouquet according to claim 21, wherein the supporting brace comprises a board middle folding line and a bottom arm integrally and vertically extended from the bottom board at a position corresponding to the board middle folding line, wherein the bottom arm is arranged to be operated to driving the unfolding of the bottom board.

23. The 3D pop up paper flower bouquet according to claim 22, wherein the supporting brace comprises a reinforcing member pivotally connected to the bottom board, wherein in the unfolded state, the reinforcing member is moved to a position biasing against the bottom board to support said bottom board in the unfolded state, wherein a circumferential edge of the bottom board is biasing against an inner surface of the vase portion in the unfolded state.

24. The 3D pop up paper flower bouquet according to claim 21, wherein the paper flower body further comprises one or more auxiliary flower portions disposed in the vase portion, and a supporting arm which is penetrated though the one or more auxiliary flower portions and is configured to be rotatable for biasing against an inner surface of the vase portion to brace the vase portion in the unfolded state.

* * * * *